(12) United States Patent
Rippberger

(10) Patent No.: US 6,309,006 B1
(45) Date of Patent: Oct. 30, 2001

(54) ATTACHMENT SYSTEM FOR TRUCK BEDS

(75) Inventor: Gary Rippberger, Elmore, OH (US)

(73) Assignee: Saddleman, Inc, Logan, UT (US)

( * ) Notice: Subject to any disclaimer, the term of this patent is extended or adjusted under 35 U.S.C. 154(b) by 0 days.

(21) Appl. No.: 09/691,465

(22) Filed: Oct. 18, 2000

Related U.S. Application Data
(60) Provisional application No. 60/160,728, filed on Oct. 21, 1999.

(51) Int. Cl.$^7$ ........................................ B60P 7/02
(52) U.S. Cl. ................................ 296/100.16; 296/100.17; 296/100.18
(58) Field of Search ........................ 296/100.16, 100.17, 296/100.18

(56) References Cited

U.S. PATENT DOCUMENTS

| | | |
|---|---|---|
| 2,496,910 | 2/1950 | Fridolph . |
| 3,186,129 | 6/1965 | Blood . |
| 3,220,469 | 11/1965 | Oehmig . |
| 3,373,464 | 3/1968 | Ausnit . |
| 3,623,690 * | 11/1971 | Bargman ................................ 296/23 |
| 3,727,972 | 4/1973 | Belk . |
| 3,955,845 * | 5/1976 | Werner ................................. 296/10 |
| 4,013,018 | 3/1977 | Hansen et al. . |
| 4,036,521 * | 7/1977 | Clenet ................................. 296/100 |
| 4,061,394 | 12/1977 | Vodin . |
| 4,231,606 * | 11/1980 | Tuerk ..................................... 296/36 |
| 4,272,119 | 6/1981 | Adams . |
| 4,273,377 | 6/1981 | Alexander . |
| 4,279,064 | 7/1981 | Simme . |
| 4,316,688 * | 2/1982 | Roskelley ............................. 410/102 |
| 4,479,677 | 10/1984 | Gulette et al. . |
| 4,607,876 | 8/1986 | Reed . |
| 4,639,033 | 1/1987 | Wheatley et al. . |
| 4,647,103 | 3/1987 | Walblay . |
| 4,730,866 | 3/1988 | Nett . |
| 4,757,854 | 7/1988 | Rippberger . |
| 4,792,179 | 12/1988 | Stevens . |
| 4,838,602 | 6/1989 | Nett . |
| 4,902,065 | 2/1990 | Thralls . |
| 4,986,332 | 1/1991 | Lanuza . |
| 5,058,652 * | 10/1991 | Wheatley et al. ................... 296/100 |
| 5,094,375 | 3/1992 | Wright . |
| 5,141,277 * | 8/1992 | Alexander ............................. 296/43 |
| 5,152,574 | 10/1992 | Tucker . |
| 5,203,055 * | 4/1993 | Broadwater ......................... 296/100 |
| 5,207,262 | 5/1993 | Rushford . |
| 5,230,377 | 7/1993 | Berman . |
| 5,261,719 | 11/1993 | Tucker . |
| 5,273,382 * | 12/1993 | Yearick ................................. 411/64 |
| 5,299,849 * | 4/1994 | Cook et al. .......................... 296/159 |
| 5,326,203 * | 7/1994 | Cockrell ............................... 410/110 |

(List continued on next page.)

OTHER PUBLICATIONS

Custom Form Mfg. Inc., "The Ultimate Tonneau," 2100 Industrial Pkwy., Elkhart, IN 46516 5/95.

Covercraft Industries, Inc., "Rail System Tonneau Cover II," Pauls Valley, OK 73075 10/93.

*Primary Examiner*—Joseph D. Pape
*Assistant Examiner*—Kiran B. Patel
(74) *Attorney, Agent, or Firm*—Thorpe North & Western

(57) ABSTRACT

An attachment system attaches a structure or tonneau cover to a truck bed with side walls having stake pockets. Fastening plates are pivotally coupled to the structure or the belt rails of the tonneau cover. The plates pivotal between a first orientation in which the plates align with the stake pockets to pass therethrough, and a second orientation in which the plates rotate with respect to the first orientation to abut the stake pockets and secure the structure to the side walls of the truck bed. Tensioners can be coupled to the structure, and engage the fastening plates, to draw the fastening plates towards the structure. A cover can be removably attached to the belt rails to cover the truck bed.

20 Claims, 8 Drawing Sheets

U.S. PATENT DOCUMENTS

| | | | |
|---|---|---|---|
| 5,360,250 | * 11/1994 | Wood et al. | 296/39.2 |
| 5,366,124 | 11/1994 | Dearborn, IV . | |
| 5,368,210 | 11/1994 | Wotring . | |
| 5,385,377 | * 1/1995 | Girard | 296/36 |
| 5,472,256 | 12/1995 | Tucker . | |
| 5,540,475 | 7/1996 | Kersting et al. . | |
| 5,560,666 | * 10/1996 | Vieirs et al. | 296/43 |
| 5,620,124 | 4/1997 | Geier . | |
| 5,636,893 | 6/1997 | Wheatley et al. . | |
| 5,655,808 | 8/1997 | Wheatley . | |
| 5,975,618 | 11/1999 | Rippberger . | |
| 6,024,401 | * 2/2000 | Wheatley et al. | 296/100.01 |
| 6,176,658 | * 1/2001 | Rowe | 410/106 |

\* cited by examiner

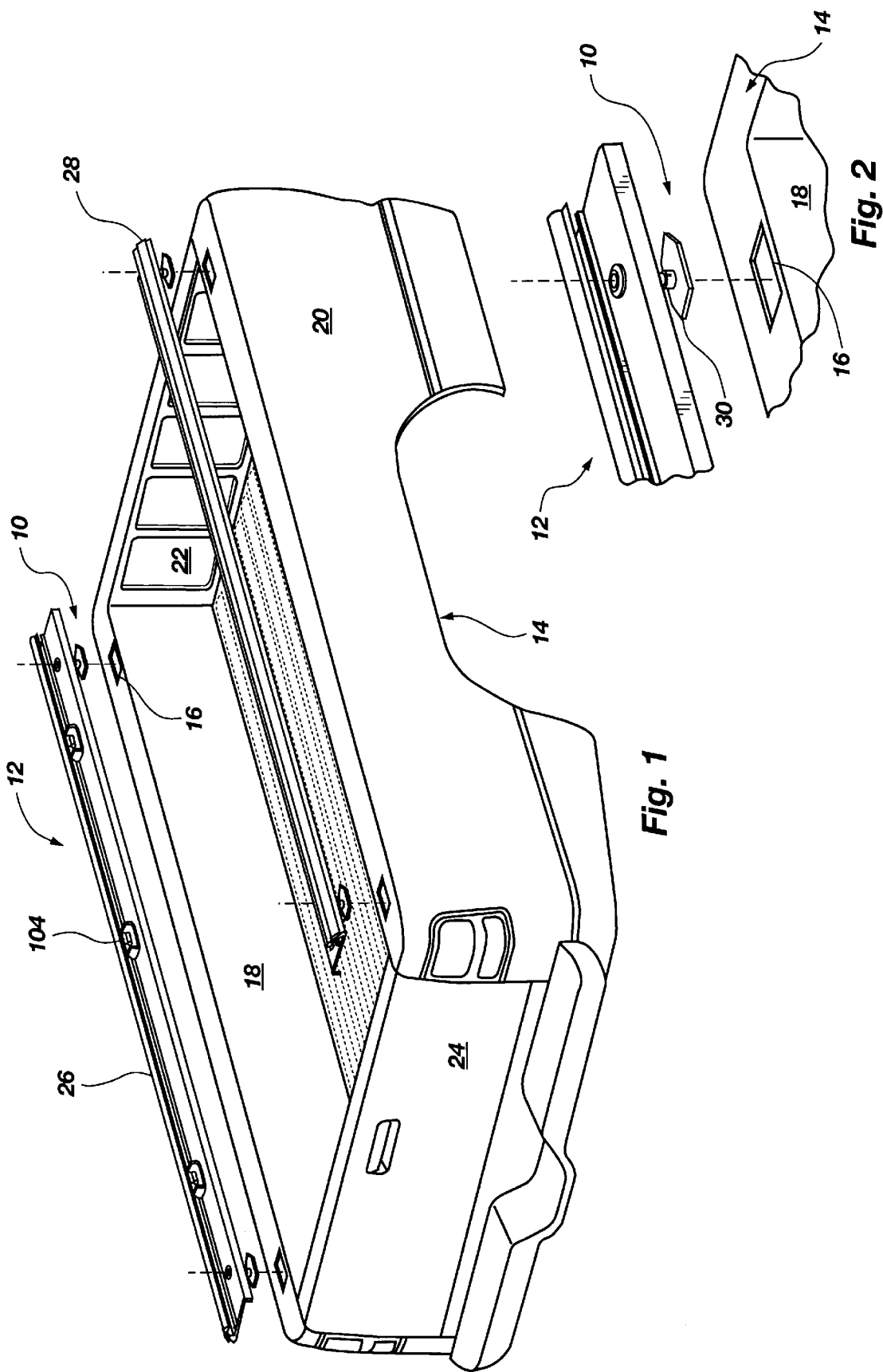

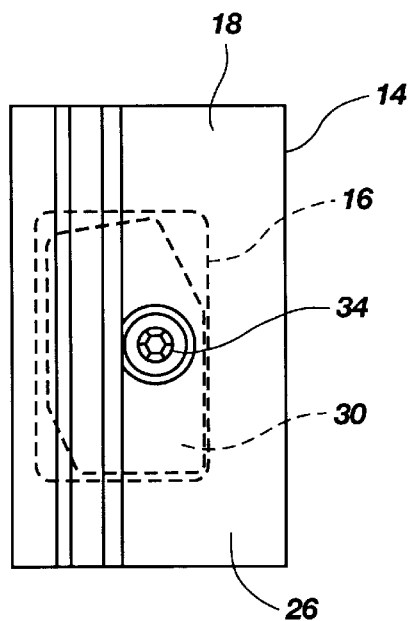
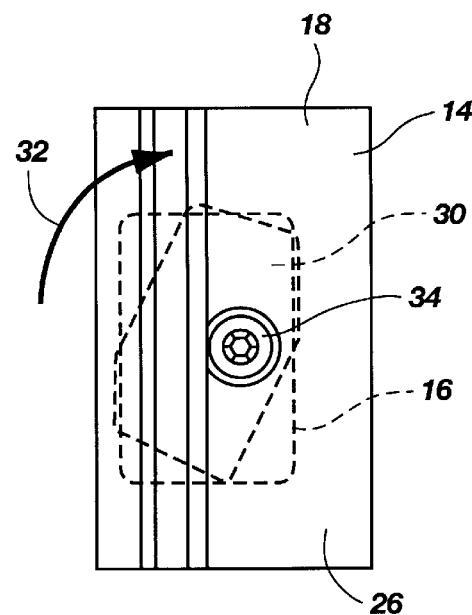
Fig. 4a　　　　　　　　Fig. 5a
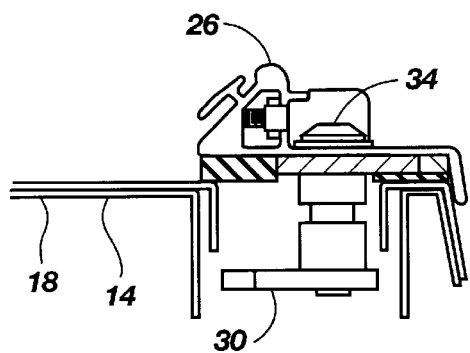
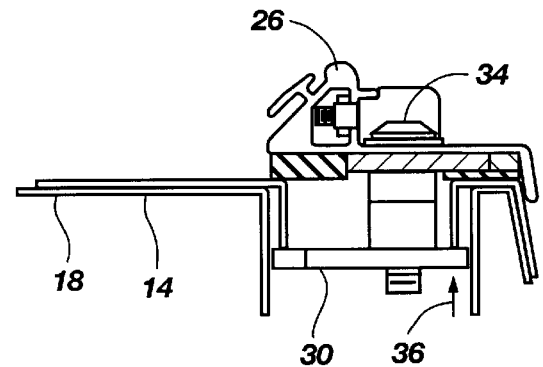
Fig. 4b　　　　　　　　Fig. 5b
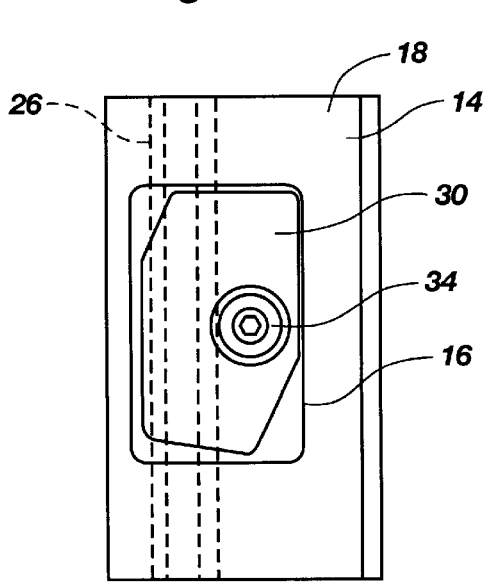
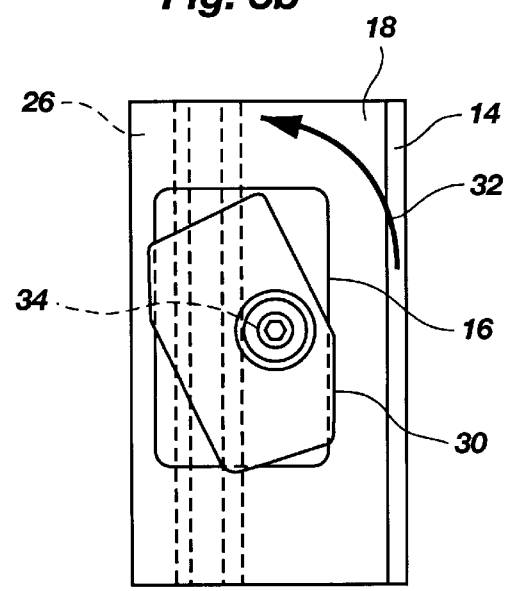
Fig. 4c　　　　　　　　Fig. 5c

ATTACHMENT SYSTEM FOR TRUCK BEDS

This application claims the benefit of U.S. Provisional Application No. 60/160,728, filed Oct. 21, 1999.

BACKGROUND OF THE INVENTION

1. The Field of the Invention

The present invention relates generally to an attachment system for attaching structures to truck beds, such as tonneau cover systems. More particularly, the present invention relates to an attachment system which utilized the stake pockets of a truck bed.

2. The Background Art

Various structures are frequently mounted on pick-up truck beds, such as campers, shells, tonneau covers, equipment racks, sport racks, etc. Such structures typically are attached to the truck bed with fasteners, such as screws or bolts, or clamps. One disadvantage with screws or bolts is that holes must be drilling in the truck bed, thus increasing the cost of installation, and permanently altering the truck bed. The clamp members typically engage a portion of the structure and a portion of a flange of the side walls of the truck.

SUMMARY OF THE INVENTION

It has been recognized that it would be advantageous to develop an attachment system capable of easily, inexpensively and effectively attaching structures to a truck bed. It has also been recognized that it would be advantageous to develop such an attachment system which utilized the stake pockets of the truck bed. It has also been recognized that it would be advantageous to develop an attachment system for attaching a tonneau cover system to a truck bed.

The invention provides an attachment system to attach a structure, such do a tonneau cover system, to a truck bed with side walls having stake pockets. The attachment system advantageously includes fastening plates which pivot after being received in the stake pockets to secure the structure to the truck bed. The fastening plates are pivotally coupled to the structure, and pivot between first and second different orientations. In the first orientation, the plates align with the stake pockets to pass therethrough. In the second orientation, the plates are rotated with respect to the first orientation in order to abut the stake pocket, and thus secure the structure to the side walls of the truck bed. The attachment system also advantageously includes tensioners which engage the fastening plates to draw the fastening plates towards the structure.

The stake pockets of the truck bed can have a large dimension or length, and a small dimension, or width. The fastening plates can have a larger dimension or length which is smaller than the length of the stake pockets, but larger than the width of the stake pockets. Thus, in the second orientation, the length of the plates can transverse the width of the stake pockets, to abut the side walls proximal the stake pockets.

In accordance with one aspect of the present invention, the tensioners can include threaded fasteners, such as bolts. The plates can include a threaded bore which receives and is engaged by the threaded fasteners. The threaded fasteners can be rotatably coupled to the structure, and rotatable to pivot the plates with respect to the structure and the stake pockets, and to displace the plates towards the structure and the stake pockets.

In accordance with another aspect of the present invention, the fastening plates can have intermediate portions to extend between the side walls proximal the stake pockets. The intermediate portions have opposite vertical abutment walls to oppose the side walls proximal the stake pockets. The abutment walls resist lateral movement between the fastening plates and the stake pockets, and thus between the structure and the side walls of the truck bed.

In accordance with another aspect of the present invention, the fastening plates can include a flange extending therefrom to engage the side walls proximal the stake pockets. The flange is inclined to force the flange against the side wall as the fastening plate pivots. The fastening plates can have an upper surface with an angled portion to force the upper surface into abutment with the side wall proximal the stake pockets. The angled portion can be arcuate and form a quarter arc, such that the fastening plates can be rotated a quarter turn.

In accordance with another aspect of the present invention, the structure can include left and right belt rails to be disposed on respective left and right side walls of the truck bed. A flexible cover can be removably attached to the left and right belt rails.

The belt rails can have outer channels with an outwardly facing and a downwardly angled orientation. The cover can have a perimeter flange which is removably received within the outer channels of the left and right belt rails.

A front belt rail can be disposed at a front side wall of the truck bed, and coupled to and between the left and right belt rails. A rear belt rail can be disposed at a rear wall/tailgate of the truck bed, and coupled to and between the left and right belt rails.

Additional features and advantages of the invention will be set forth in the detailed description which follows, taken in conjunction with the accompanying drawing, which together illustrate by way of example, the features of the invention.

BRIEF DESCRIPTION OF THE DRAWINGS

FIG. 1 is a perspective view of an attachment system attaching a tonneau system to a truck bed in accordance with the present invention;

FIG. 2 is a partial perspective view of the attachment system of FIG. 1;

FIGS. 4a–c are top, end and bottom views, respectively, of the attachment system of FIG. 1 in a first orientation;

FIGS. 5a–c are top, end and bottom views, respectively, of the attachment system of FIG. 1 in a second orientation;

DETAILED DESCRIPTION

Figure 3:
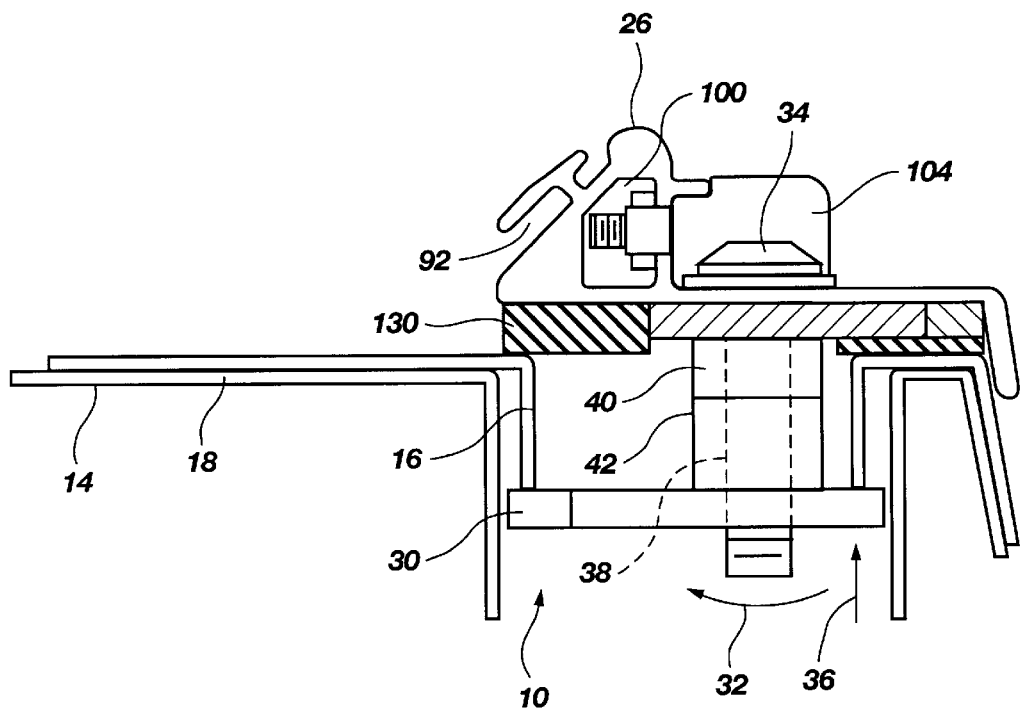
FIG. 3 is a side view of the attachment system of FIG. 1.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

As illustrated in FIGS. 1–3, a fastening or attachment system, indicated generally at 10, in accordance with the present invention is shown for attaching structures, such as a tonneau system, indicated generally at 12, to a truck bed 14. The attachment system 10 advantageously attaches or secures structure or the tonneau system 12 to the stake pockets 16 of the truck bed 14, as discussed in greater detail below. A tonneau system is one example of a field which may benefit from use of such an attachment system 10. The attachment system 10 of the present invention is illustrated and described herein, by way of example, as attaching the tonneau system 12 to the truck bed 14. It is of course understood that the attachment system 10 may be used to secure any structure to the truck bed 14, including for example, campers, shells, equipment racks, sport racks, tool boxes, wall or edge protectors, cargo nets, etc.

The truck bed 14 includes left and right side walls 18 and 20, a front wall 22, and a rear wall/tailgate 24. The walls 18, 20, 22 and 24 of the truck bed 14 form a generally continuous upper edge or surface. A plurality of stake pockets 16 are formed in the upper edge or surface of the left and right side walls 18 and 20. A truck bed 14 typically includes four stake pockets 16 with two stake pockets being formed in each side wall, one near the front and one near the rear. The stake pockets 16 are typically configured to receive posts which secure extensions of the walls, or accommodate other equipment. The stake pockets 16 are typically rectangular and have a longer length and a shorter width.

The tonneau system 12 includes a plurality of belt rails which are disposed on and secured to the upper edge of the side walls of the truck bed. A cover is secured to the belt rails. The belt rails can include left and right belt rails 26 and 28 attached to respective left and right side walls 18 and 20 of the truck bed 14.

As stated above, the attachment system 10 advantageously utilizes the preexisting stake pockets 16 of the truck bed 14 such that the side walls need not be permanently altered, and such that clamps are not needed. The attachment system 10 includes fastening plates 30 pivotally coupled to the left and right belt rails 26 and 28, indicated by arrow 32. Referring to FIGS. 4a–5c, the plates 30 advantageously pivot between a first orientation, shown in FIGS. 4a–4c, and a second orientation, shown in FIGS. 5a–5c. In the first orientation, the plates 30 are oriented to align with the stake pockets 16 in order to pass therethrough, as shown in FIGS. 4a–4c. In the second orientation, the plates 30 are rotated with respect to the first orientation to abut and/or transverse the side walls proximal the stake pocket to secure the structure or belt rails 26 and 28 to the side walls 18 and 20 of the truck bed 14, as shown in FIGS. 5a–5c.

The fastening plates 30 are sized and shaped to be received within the stake pockets 16. Thus, the fastening plates 30 have a long dimension or length L which is less than the length of the stake pockets 16, and a short dimension or width W which is less than or equal to the width of the stake pockets 16. It will be appreciated that any non-circular shape can be used. The fastening plates can be oblong, or have a longer length and a shorter width. Therefore, the fastening plates 30 may pass through the stake pockets 16 in the first orientation, but not in the second orientation.

Referring again to FIG. 3, the attachment system 10 advantageously includes tensioners 34 coupled to the structure, or belt rails 26 and 28, and plates 30 to draw the plates 30 towards the belt rails 26 and 28 and side walls proximal the stake pockets 16, to secure or tighten the rails 26 and 28 to the side walls 18 and 20, indicated by arrow 36. In addition, the tensioners 34 can be pivotally coupled to the belt rails 26 and 28, and can pivot 32 the plates 30 between the first and second orientations, as shown in FIGS. 4a–5c. The tensioners 34 can be threaded fasteners, such as bolts, which extend generally perpendicularly through apertures in the belt rails 26 and 28, and threadedly engage the plates 30. The plates 30 can have threaded bores 38 to rotationally receive the threaded fasteners. Thus, as the threaded fasteners are turned, the plates both pivot 32 (FIGS. 4a–5c) and displace along the length of the fasteners towards the wall surrounding the stake pocket 16 and the structure or rails 26 and 28. The plates 30 can displace between first and second positions. In the first position, the plate 30 can be disposed away from the belt rails 26 and 28, and thus away from the side walls proximal the stake pockets 16. In the second position, the plates 30 can be disposed toward the belt rails 26 and 28, and against the side walls proximal the stake pockets 16.

Referring again to FIGS. 4a–4c, the fastening plates 30 can match the shape of the stake pockets 16, and can have a substantially rectangular shape. The corners of the plates 30 can be beveled or chamfered to allow the plates 30 to pivot within the stake pockets 16. In addition, the plates 30 preferably can be parallel with the structure or rails 26 and 28, and thus parallel with the edge or surface or the side walls 18 and 20, or perpendicular to an axis of the stake pockets 16. The plates 30 preferably pivot or rotate about the tensioner 34 parallel with the axis of the stake pockets 16. Referring to FIG. 3, a sleeve 40 can be disposed around the threaded fastener and through the aperture in the belt rails 26 and 28. The threaded fastener can rotate within the sleeve 40. A protrusion 42 can be formed on the plate 30, and the threaded bore 38 can extend through the protrusion 42 and the plate 30. The sleeve 40 of the belt rails 26 and 28 can abut the protrusion 42 of the plate 30 in the second position.

Figure 7A:
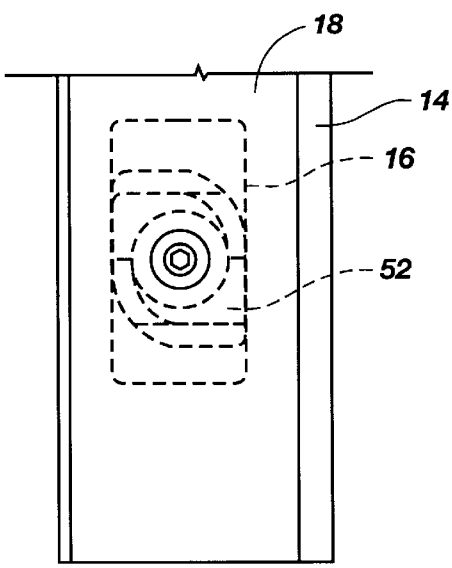
FIGS. 7a–c are top, end and bottom views, respectively, of the attachment system of FIG. 6 in a first orientation.
Figure 8A:
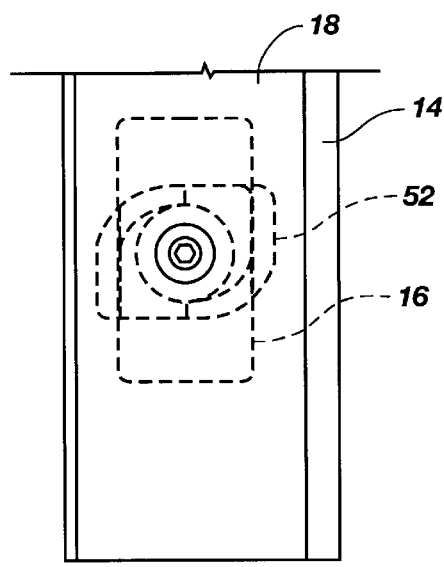
FIGS. 8a–c are top, end and bottom views, respectively, of the attachment system of FIG. 6 in a second orientation.
Figure 7B:
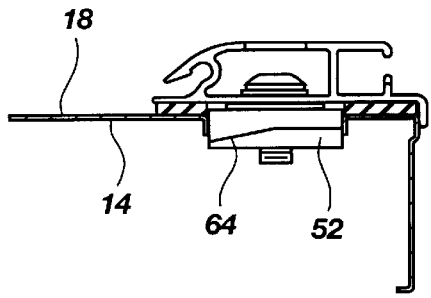
Figure 8B:
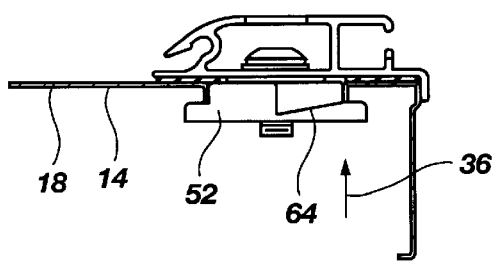
Figure 7C:
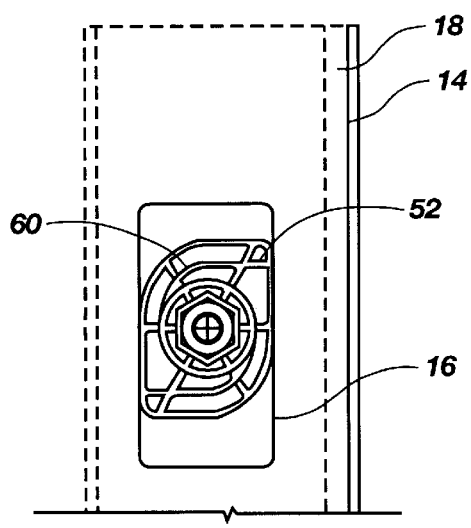
Figure 8C:
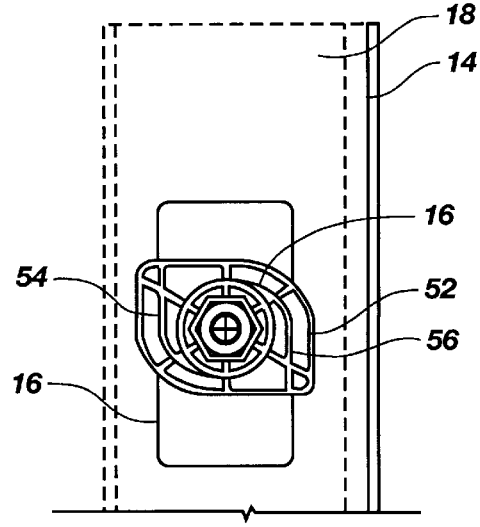
Figure 9:
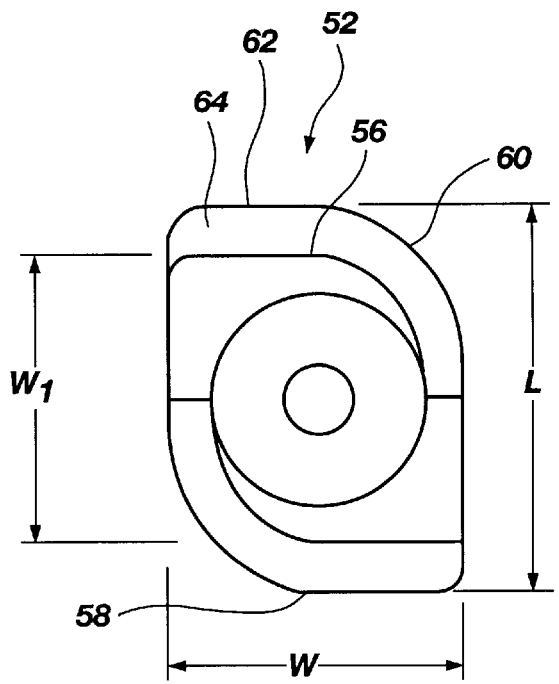
FIG. 9 is a top view of another fastening plate in accordance with the present invention.
Figure 11:
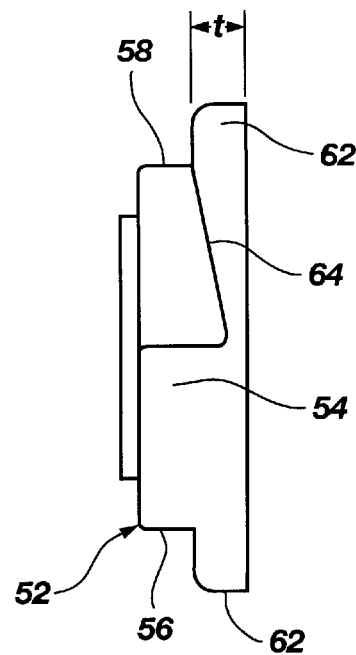
FIG. 11 is a side view of the fastening plate of FIG. 9.
Figure 10:
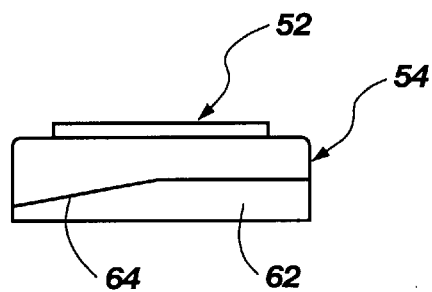
FIG. 10 is an end side view of the fastening plate of FIG. 9.

Referring to FIGS. 6 and 9–11, another attachment system, indicated generally at 50, is similar in various aspects the to system 10 described above. The attachment system 50 also includes plates 52 which can be inserted into the stake pockets 16 in a first orientation, as shown in FIGS. 7a–c, but abut and/or transverse the walls surrounding the stake pockets 16 in a second, different rotated orientation, as shown in FIGS. 8a–c.

In addition, the fastening plates 52 can have intermediate portions 54 which extend between and fill the stake pockets 16 to resist lateral movement between the fastening plates 52 and the stake pockets 16, and thus between the structure or belt rails and the side walls 18 and 20. The intermediate portions 52 have opposite vertical abutment walls 56 and 58 which abut the side walls of the stake pockets 16. The abutment walls 56 and 58 can have rounded or tapered portions 60 which extend from a smaller diameter to the abutment walls 56 and 58 to guide the abutment walls 56 and 58 into contact with the walls proximal the stake pockets 16 as the plates 52 pivot, as shown in FIGS. 7c and 8c. The opposing vertical abutment walls 56 and 58 preferably form a width therebetween them W1 which is roughly equal to the width of the side pockets 16.

The fastening plates 52 include flanges 62 which extend from and protrude from the fastening plates 52 to engage the perimeter walls of the stake pockets 16. The fastening plates 52 or flanges 62 can have an upper inclined surface 64. The angled surface 64 is inclined and abuts or engages the side walls surrounding the stake pockets 16 to force upper surface 64 of the fastening plates into abutment with the walls surrounding the stake pockets 16. The inclined surfaces 64 can form a quarter arc similar to a screw such that as the fastening plates 52 are rotated in a quarter turn, the upper surfaces 64 are forced against the side walls surrounding the stake pockets 16. The flanges 62 can have a varying thickness to create the inclined surface 64. The inclined surface 64 of the fastening plates 52 causes the belt rails to be drawn against the side walls as the fastening plates 52 turn. Thus, the inclined surface 64 tracks along the perimeter wall surrounding the stake pockets 16, forcing the belt rails against the side walls.

Figure 12A:
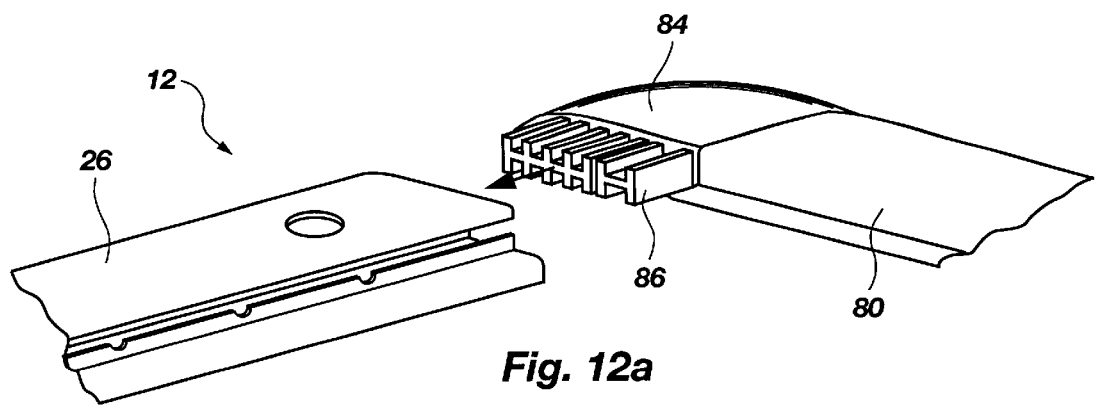
FIGS. 12a and b are partial perspective views of belt rails in accordance with the present invention.
Figure 12B:
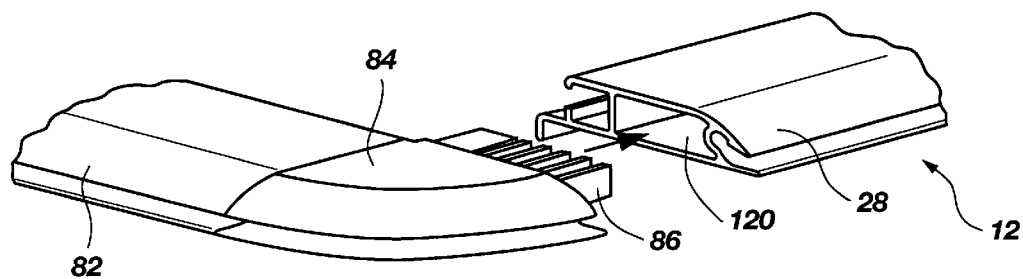
Figure 13:
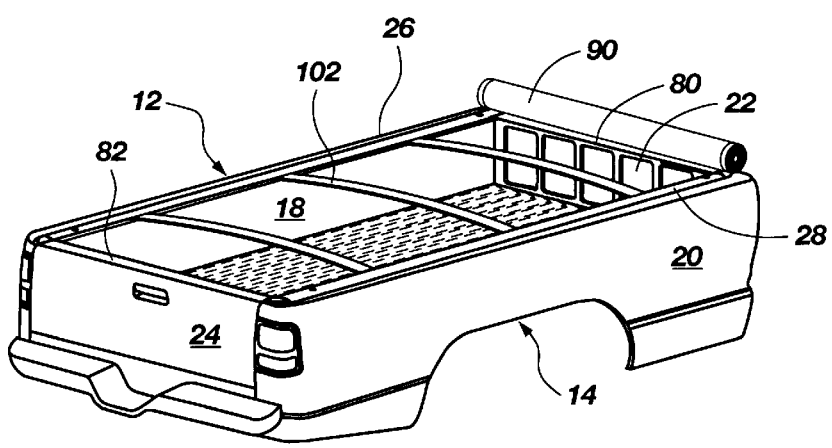
FIG. 13 is a perspective view of a tonneau cover system attached to a truck bed in accordance with the present invention in an open position.

Referring to FIGS. 12a–13, the tonneau system 12 can include a front belt rail 80 disposed on the front side wall 22, and a rear belt rail 82 disposed on the wall/tailgate 24. The front and rear belt rails 80 and 82 are coupled to and between the left and right side belt rails 26 and 28. A plurality of corners or corner members 84 are coupled to the ends of the belt rails for coupling adjacent ends of the belt rails. The corners have protrusions 86 for inserting into the belt rails.

The tonneau system 12 also includes a cover 90 associated with the belt rails. The cover 90 preferably is flexible, and removably coupled to the belt rails. Thus, the cover 90 can extend or be formed between a first open position, and a second closed position. In the first open position, shown in FIG. 13, the flexible cover can be rolled into a bundle at the front belt rail 80. In the second closed position, shown in FIG. 14, the cover can be attached to the belt rails and extend over the truck bed 14.

Figure 6:
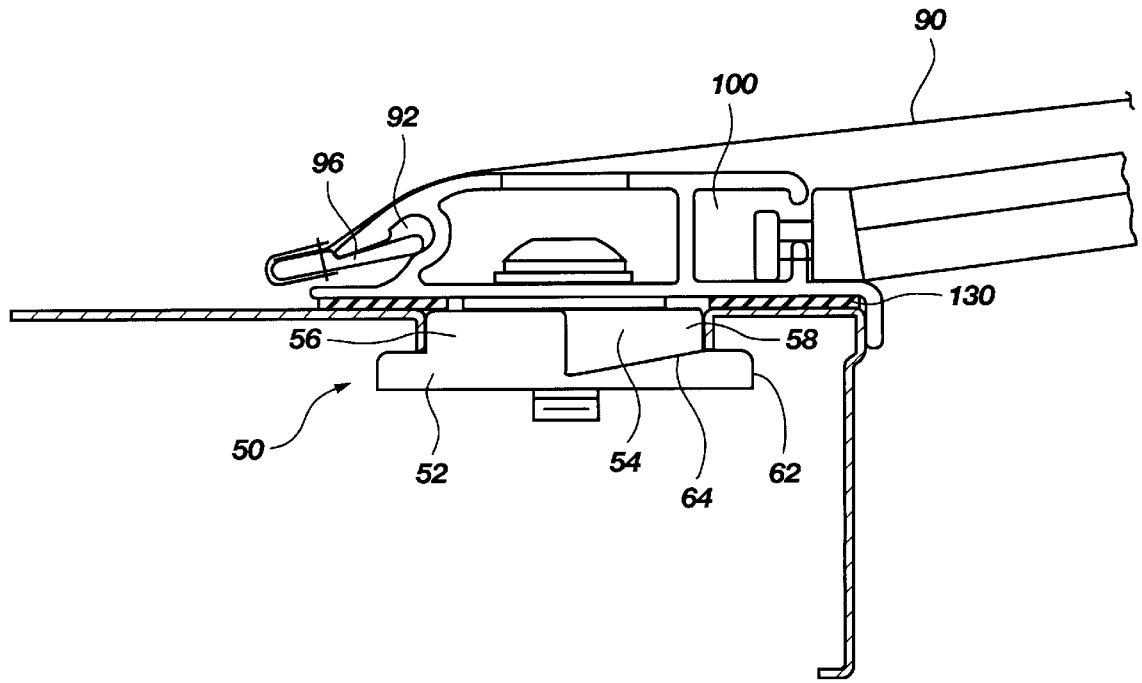
FIG. 6 is a side view of another attachment system in accordance with the present invention.
Figure 15:
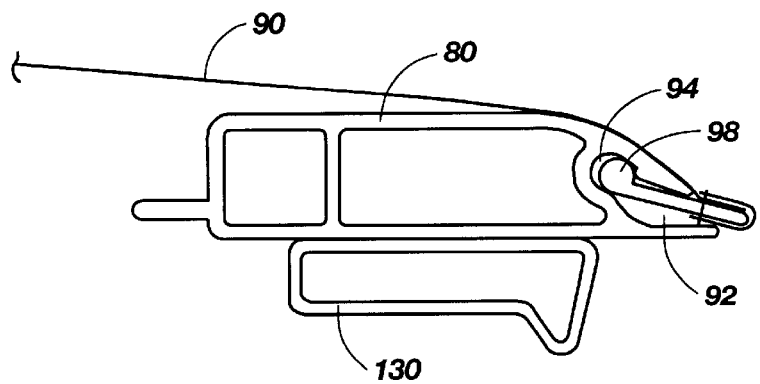
FIG. 15 is a cross sectional side view of a front belt rail in accordance with the present invention.
Figure 16:
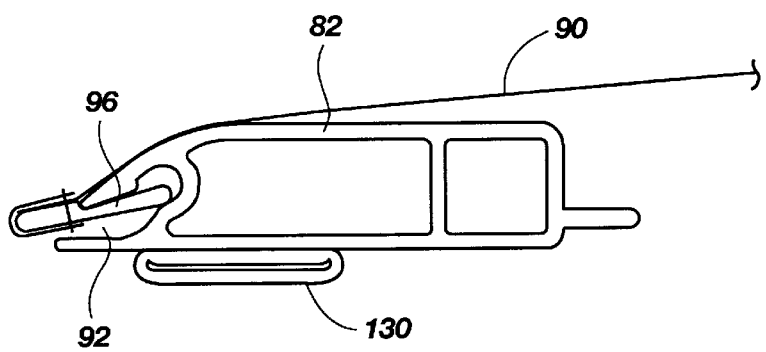
FIG. 16 is a cross sectional side view of a rear belt rail in accordance with the present invention.

Referring to FIGS. 3 and 6, the left and right belt rails 26 and 28 can include an outer channels 92. The outer channel 92 is configured to face outwardly away from the truck bed 14, and is also oriented to face at a downward angle. Similarly, the front and rear belt rails 80 and 82 outer channels 92, as shown in FIGS. 15 and 16. The front rail 80 also can have an enlarged inner portion 94 in the channel 92.

The flexible cover 90 can be releasably attached around its perimeter to the belt rails 26, 28, 80 and 82. The flexible cover 90 can have a perimeter flange 96 which is received within the outer channel 92 of the belt rails, to releasably attach the cover 90 to the rails, and thus the truck bed 14. The front of the cover 90 may have a flange 96 with an enlarged end 98 which is received within the enlarged portion 94 of the outer channel 92, as shown in FIG. 15, to more permanently secure the cover 90 to the front rail 80.

Figure 14:
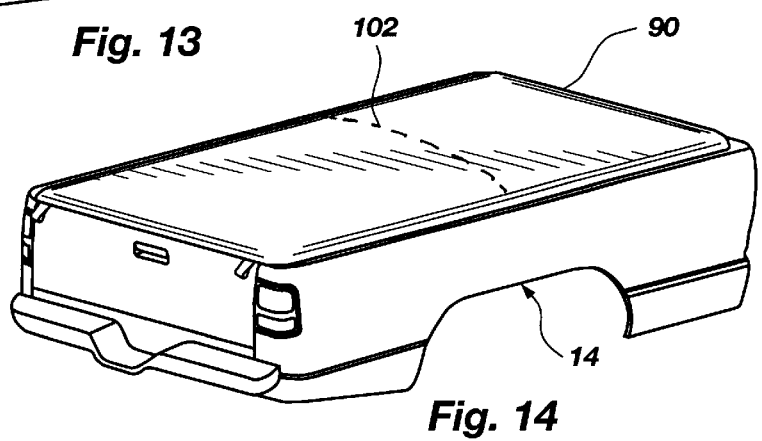
FIG. 14 is a perspective view of the tonneau cover system of FIG. 13 in a closed position.

Thus, the cover 90 may be secured at its perimeter around the rails to cover the truck bed 14, as shown in FIG. 14. In addition, the cover 90 may be released from the side rails 26 and 28 and the rear rail 82, and rolled up onto the front rail 80 to expose the truck bed 14, as shown in FIG. 13.

The belt rails also can include an inner channel 100 configured to face inwardly into the truck bed 14. The inner channel 100 can be used to secure support bows 102. The support bows 102 extend over the truck bed 14 between the left and right belt rails 26 and 28 to support the cover 90, as shown in FIGS. 12 and 13. Referring again to FIGS. 1 and 3, braces 104 can be coupled to the belt rails 26 and 28 to receive the ends of the support bows 102.

Figure 18:
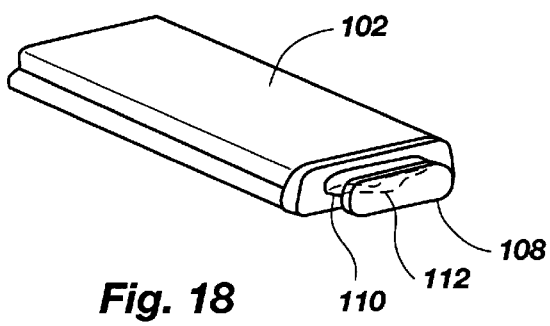
FIG. 18 is a partial perspective view of a support bow in accordance with the present invention.
Figure 17:
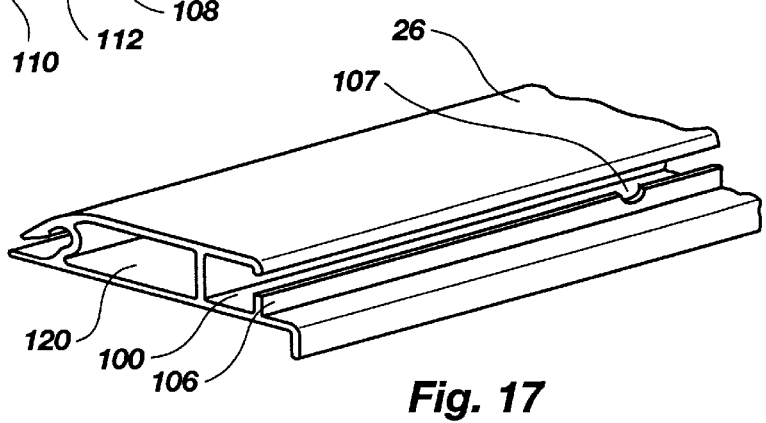
FIG. 17 is a partial perspective view of a side belt rail in accordance with the present invention.

Alternatively, referring to FIG. 17, the inner channels 100 can have an upwardly projecting lip 106, and indentations 107 formed in the lip 106. Referring to FIG. 18, the support bows 102 can have downwardly extending flanges 108 at opposite ends thereof. The flanges 108 can form a channel 110 with a protrusion 112 therein. The downwardly extending flanges 108 of the support bows 102 can be received within the inner channel 100 of the side belt rails 26 and 28. The flanges 108 and the lip 106 of the inner channels 100 fasten the support bows 102 in the inner channels 100. The protrusion 112 of the support bows 102 can be received in the indentation 107 formed in the lip 106 of the inner channels 100. The protrusion 112 and indentation 107 prevent relative movement between the support bows 102 and the side belt rails 26 and 28.

The left and right belt rails also have an interior hollow 120. The protrusions 86 of the corners 84 are received within the hollow 120.

The tonneau system 10 also can include a seal 130 disposed between the rails and the side walls of the truck bed 14. As the fastening plates 30 or 52 are turned, the rails and fastening plate are forced against the perimeter walls, compressing the seal 130.

Figure 19:
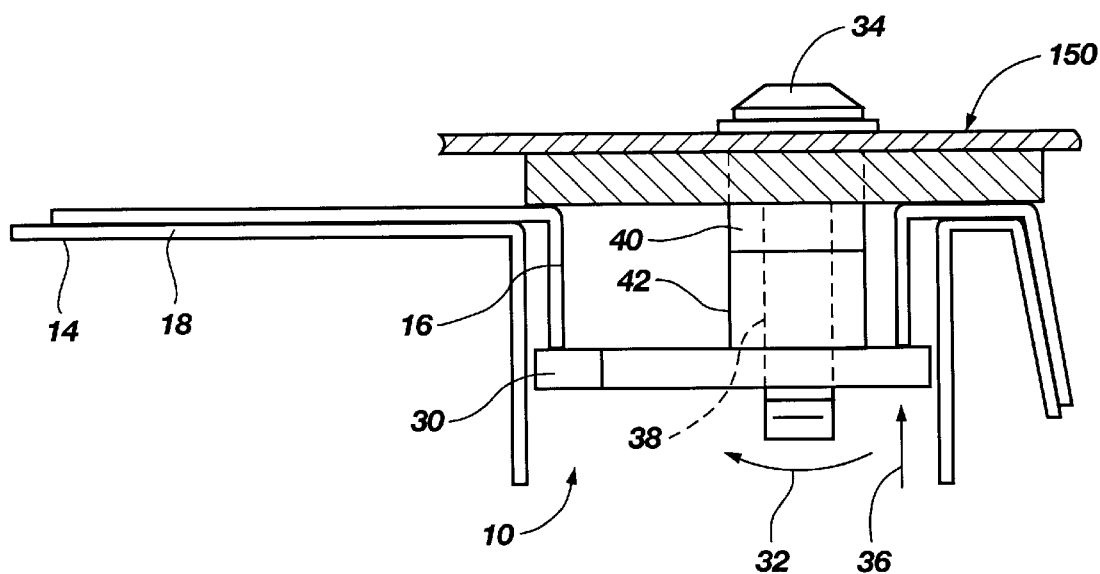
FIG. 19 is a side view of the attachment system.

Referring to FIG. 19, and as stated above, the attachment system 10 of the present invention can attach structures, indicated generally by 150, to the truck bed 14. Such structures 150 can include camper shells, equipment racks, sport racks, tool boxes, wall or edge protectors, cargo nets, etc.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An attachment system to attach a structure to a truck bed with side walls having stake pockets, the attachment system comprising:

fastening plates, pivotally coupled to the structure and receivable in the stake pockets, and pivotal between 1) a first orientation in which the plate is oriented perpendicular to an axis of the stake pocket and to align with the stake pocket to pass therethrough, and 2) a second orientation in which the plate is rotated with respect to the first orientation to abut the stake pocket to secure the structure to the side walls of the truck bed; and the fastening plates having a length smaller than a length of the stake pockets, but larger than a width of the stake pockets; and tensioners, coupled to the structure and engaging the fastening plates, to draw the fastening plates towards the structure.

2. A device in accordance with claim 1, wherein each of the plates includes a threaded bore; and wherein the tensioners included threaded fasteners, rotatably coupled to the structure to rotatably engage the threaded bores of the plates, the threaded fasteners being rotatable to pivot the plates with respect to the structure and the stake pockets, and to displace the plates towards the structure and the stake pockets.

3. A device in accordance with claim 1, wherein the fastening plates have intermediate portions to extend between the side walls proximal the stake pockets, the intermediate portions having opposite vertical abutment walls to oppose the side walls proximal the stake pockets to resist lateral movement between the fastening plates and the stake pockets, and thus between the structure and the side walls of the truck bed.

4. A device in accordance with claim 1, wherein each of the fastening plates include at least one flange extending therefrom to engage the side walls proximal the stake pockets; and wherein the flange is inclined to force the flange against the side wall as the fastening plate pivots.

5. A device in accordance with claim 1, wherein each of the fastening plates have an upper surface, and wherein a portion of the upper surface is an angled portion to force a portion of the upper surface into abutment with the side wall proximal the stake pockets.

6. A device in accordance with claim 5, wherein the angled portion is arcuate and forms a quarter arc, and wherein the fastening plates are rotatable a quarter turn.

7. A device in accordance with claim 1, wherein each of the fastening plates have at least one horizontal flange with varying thickness.

8. A device in accordance with claim 1, wherein the structure further includes left and right belt rails to be disposed on left and right side walls of the truck bed; and further comprising:

a flexible cover, removably attached to the left and right belt rails.

9. A tonneau system for a truck bed having left and right side walls with stake pockets, the tonneau system comprising:

left and right side belt rails, to be attached to the respective left and right side walls of the truck bed;

fastening plates, pivotally coupled to each of the left and right side belt rails, to be received by the stake pockets, the fastening plates have a length smaller than a length of the stake pockets, but larger than a width of the stake pockets, the fastening plates being pivotal between 1) a first orientation in which the plates are oriented perpendicular to axes of the stake pockets and to align with the stake pockets to pass therethrough, and 2) a second orientation in which the plates are to transverse the stake pockets to abut the side walls proximal the stake pockets to secure the left and right belt rails to the respective left and right side walls of the truck bed; and a cover, coupled to the belt rails.

10. A system in accordance with claim 9, wherein the cover is formed of a flexible material, and is releasably attached to the belt rails.

11. A system in accordance with claim 9, wherein each of the plates includes a threaded bore formed therein perpendicular to the plate; and further comprising:

threaded fasteners, rotatably coupled to the structure and rotatably engaging the threaded bores of the plates, the threaded fasteners being rotatable to pivot the plates with respect to the structure and the stake pockets, and to displace the plates towards the structure and the stake pockets.

12. A system in accordance with claim 9, wherein the fastening plates have intermediate portions to extend between the side walls proximal the stake pockets, the intermediate portions having opposite vertical abutment walls to oppose the side walls proximal the stake pockets to resist lateral movement between the fastening plates and the stake pockets, and thus between the structure and the side walls of the truck bed.

13. A system in accordance with claim 9, wherein each of the fastening plates have an upper surface, and wherein a portion of the upper surface is an angled portion to force a portion of the upper surface into abutment with the side wall proximal the stake pockets.

14. A tonneau system a truck bed having left and right side walls with stake pockets, the tonneau system comprising:

a) left and right side belt rails, to be attached to the respective left and right side walls of the truck bed, having outer channels with an outwardly facing and a downwardly angled orientation;

b) fastening plates, pivotally coupled to each of the left and right side belt rails, to be received by the stake pockets, c) the fastening plates have a length smaller than a length of the stake pockets, but larger than a width of the stake pockets, d) the fastening plates being pivotal between 1) a first orientation in which the plates are oriented perpendicular to axes of the stake pockets and to align with the stake pockets to pass therethrough, and 2) a second orientation in which the plates are to transverse the stake pockets to abut the side walls proximal the stake pockets to secure the left and right belt rails to the respective left and right side walls of the truck bed; and e) a flexible cover, removably attached to the left and right belt rails, having a perimeter flange removably received within the outer channels of the left and right belt rails.

15. A system in accordance with claim 14, further comprising:

a) a front belt rail, to be disposed at a front side wall of the truck bed, and coupled to and between the left and right belt rails, and having an outer channel with an outwardly facing orientation and an enlarged interior; and b) a rear belt rail, to be disposed at a rear wall/tailgate of the truck bed, and coupled to and between the left and right belt rails, and having an outer channel with an outwardly facing and a downwardly angled orientation; and wherein the cover further includes:

a) a front perimeter flange, disposed in the outer channel of the front belt rail, having an enlarged tip disposed in the enlarged interior; and b) a rear perimeter flange, removably disposed in the outer channel of the rear wall/tailgate.

16. A system in accordance with claim 15, wherein each of the belt rails further include a hollow; and further comprising:
   a plurality of corners, coupled to ends of the belt rails, to coupling adjacent ends of the belt rails, each corner having protrusions inserted into the hollows of the belt rails.

17. A system in accordance with claim 14, wherein the left and right belt rails further include interior channels; and further comprising:
   at least one support bow, coupled to and between the left and right belt rails at an intermediate location, having flanges received within the inner channels of the left and right belt rails.

18. A system in accordance with claim 14, wherein each of the plates includes a threaded bore formed therein perpendicular to the plate; and further comprising:
   threaded fasteners, rotatably coupled to the structure and rotatably engaging the threaded bores of the plates, the threaded fasteners being rotatable to pivot the plates with respect to the structure and the stake pockets, and to displace the plates towards the structure and the stake pockets.

19. A system in accordance with claim 14, wherein the fastening plates have intermediate portions to extend between the side walls proximal the stake pockets, the intermediate portions having opposite vertical abutment walls to oppose the side walls proximal the stake pockets to resist lateral movement between the fastening plates and the stake pockets, and thus between the structure and the side walls of the truck bed.

20. A system in accordance with claim 14, wherein each of the fastening plates have an upper surface, and wherein a portion of the upper surface is an angled portion to force a portion of the upper surface into abutment with the side wall proximal the stake pockets.

* * * * *